US008139886B2

(12) United States Patent
Szeliski et al.

(10) Patent No.: US 8,139,886 B2
(45) Date of Patent: Mar. 20, 2012

(54) BLUR ESTIMATION (75) Inventors: Richard Szeliski, Kirkland, WA (US); Neel Joshi, La Jolla, CA (US); Charles Lawrence Zitnick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 12/143,837

(22) Filed: Jun. 23, 2008

(65) Prior Publication Data

US 2009/0316995 A1 Dec. 24, 2009

(51) Int. Cl.
G06K 9/40 (2006.01)
G06K 9/48 (2006.01)
(52) U.S. Cl. ......... 382/260; 382/199; 382/266; 382/274
(58) Field of Classification Search .......... 382/260–269, 382/199, 274, 254–255, 128–132, 240, 162, 382/167, 298–300; 348/208.4–208.6, 208.99, 348/218.1, 246, 252, 584, 294, 242; 358/3.06, 358/3.26–3.27
See application file for complete search history.

(56) References Cited

U.S. PATENT DOCUMENTS

| 6,259,822 | B1 * | 7/2001 | Hamilton et al. | 382/266 |
|---|---|---|---|---|
| 6,611,627 | B1 * | 8/2003 | LaRossa et al. | 382/240 |
| 7,260,270 | B2 | 8/2007 | Kusaka | |
| 7,616,826 | B2 * | 11/2009 | Freeman et al. | 382/255 |
| 7,719,719 | B2 * | 5/2010 | Loce et al. | 358/3.06 |
| 2005/0265621 | A1 | 12/2005 | Biggs et al. | |
| 2006/0110147 | A1 | 5/2006 | Tomita et al. | |
| 2006/0125938 | A1 | 6/2006 | Ben-Ezra et al. | |
| 2006/0279639 | A1 | 12/2006 | Silverstein et al. | |
| 2007/0009169 | A1 | 1/2007 | Bhattacharjya | |
| 2007/0058073 | A1 | 3/2007 | Steinberg et al. | |
| 2007/0217713 | A1 | 9/2007 | Milanfar et al. | |
| 2011/0090352 | A1 * | 4/2011 | Wang et al. | 348/208.6 |

OTHER PUBLICATIONS

TUDelft, "Model-based point spread function estimation", Quantitative Imaging Group, Retrieved on Nov. 23, 2007, pp. 155-161.
Hall, et al., "Nonparametric estimation of a point-spread function in multivariate problems", In the Annals of Statistics, vol. 35, No. 4, 2007, pp. 1-25.
"The point-spread function (PSF) model of blurring", http://homepages.inf.ed.ac.uk/rbf/CVonline/LOCAL_COPIES/VELDHUIZEN/node10.html.
Luxen, et al., "Characterizing Image Quality: Blind Estimation of the Point Spread Function From a Single Image", In Proceedings of Photogrammetric Computer Vision, 2002, 6 pages.
Takeda, et al., "Regularized Kernel Regression for Image Deblurring", In Fortieth Asilomar Conference on Signals, Systems and Computers, Pacific Grove, CA, USA, Oct.-Nov. 2006, pp. 1914-1918.
Burn, et al., "Using Slanted Edge Analysis for Color Registration Measurement", In IS&T PICS Conference, Society for Imaging Science and Technology, 1999, pp. 51-53.
Cho, et al., "Removing Non-Uniform Motion Blur from Images", In IEEE 11th International Conference on Computer Vision, Oct. 14-21, 2007, pp. 1-8.
Fegus, et al., "Removing Camera Shake from a Single Photograph", In ACM Transactions on Graphics, vol. 27, No. 3, Aug. 2006, pp. 787-794.

(Continued)

Primary Examiner — Ishrat I Sherali (57) ABSTRACT

A two-dimensional blur kernel is computed for a digital image by first estimating a sharp image from the digital image. The sharp image is derived from the digital image by sharpening at least portions of the digital image. The two-dimensional blur function is computed by minimizing an optimization algorithm that estimates the blur function.

19 Claims, 5 Drawing Sheets

OTHER PUBLICATIONS

Jia, et al., "Single Image Motion Deblurring Using Transparency", In IEEE Conference on Computer Vision and Pattern Recognition, Jun. 17-22, 2007, pp. 1-8.

Kundur, et al., "Blind Image Deconvolution", In IEEE Signal Processing Magzine, vol. 13, No. 3, May 1996, pp. 43-64.

Levin, et al., "Blind Motion Deblurring Using Image Statistics", In Advances in Neural Information Processing Systems, MIT Press, 2006, 8 pages.

Levy, et al., "Modulation transfer function of a lens measured with a random target method", In Applied Optics, vol. 38, No. 4, Feb. 1, 1999, pp. 679-683.

Liu, et al., "Noise estimation from a single image", In IEEE Conference on Computer Vision and Pattern Recognition, vol. 2, New York, Jun. 2006, pp. 901-908.

Nayar, et al., "Real-Time Focus Range Sensor", In Fifth International Conference on Computer Vision, Cambridge, Massachusetts, Jun. 1995, pp. 995-1001.

Shan, et al., "Rotational Motion Deblurring of a Rigid Object from a Single Image", In IEEE 11th International Conference on Computer Vision, Oct. 14-21, 2007, pp. 1-8.

S. B. Kang. Automatic removal of chromatic aberration from a single image. In CVPR '07, pp. 1-8, Jun. 17-22, 2007.

S. E. Reichenbach, S. K. Park, and R. Narayanswamy. Characterizing digital image acquisition devices. Optical Engineering, 30(2):170-177, Feb. 1991.

* cited by examiner

BLUR ESTIMATION

BACKGROUND

Image blur can be introduced in a number of ways when a camera is used to capture an image. Image blur can have various causes, such as movement of the camera or the subject being photographed, incorrect focus, or inherent features of the camera, such the camera's pixel size, the resolution of the camera's sensor, or its use of anti-aliasing filters on the sensor.

Figure 1:
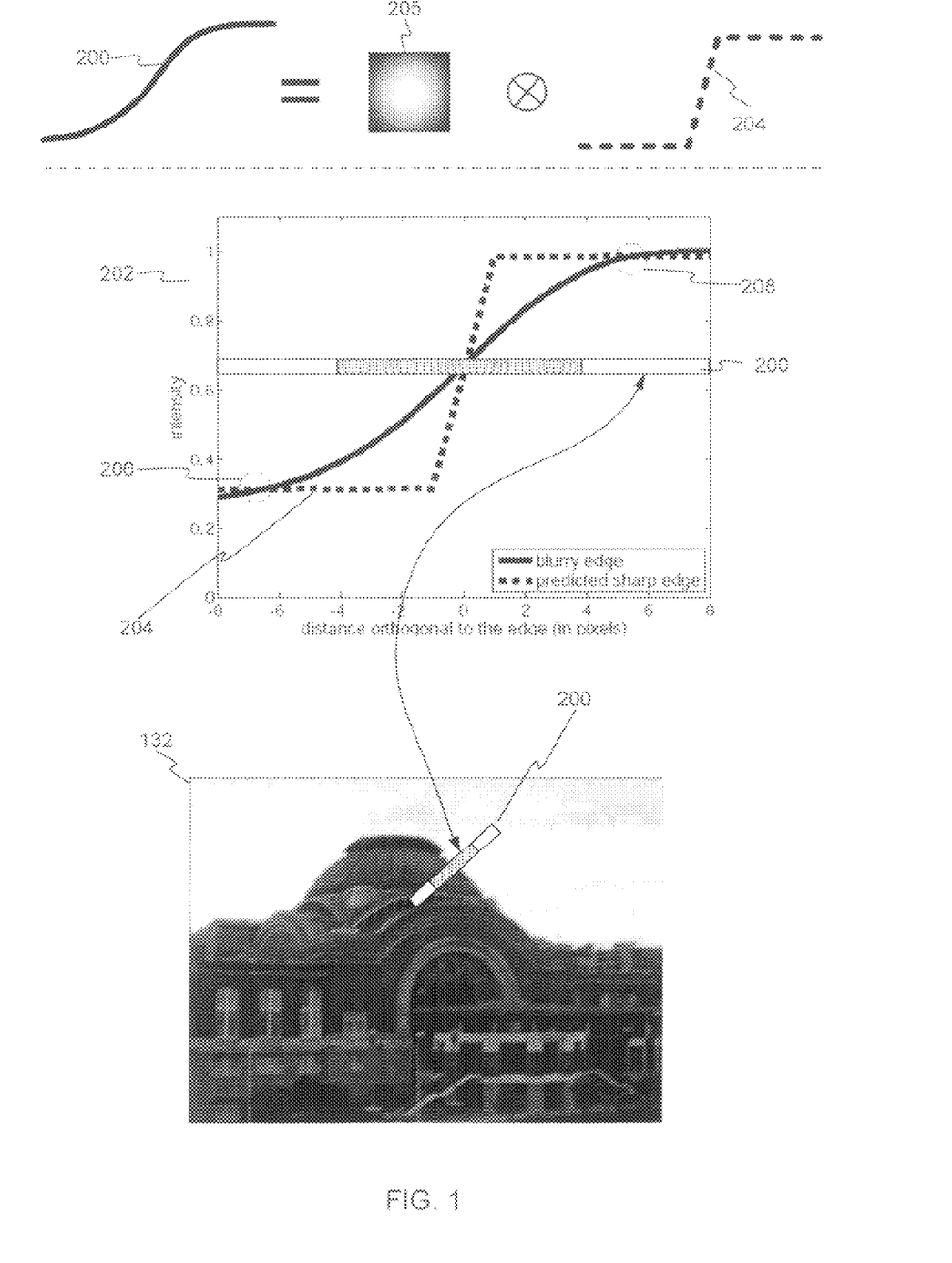
FIG. 1 shows a blurry image and a de-blurred image.

FIG. 1 shows a blurry image 100 and a de-blurred image 102. Image de-blurring has been performed previously in a number of ways. For example, an image can be de-blurred using a deconvolution algorithm, which previously has hinged on accurate knowledge of a blur kernel (blur kernels are described in greater detail further below). Thus, finding a blur kernel is an important and useful endeavor. Blur kernels can have uses other than deconvolution. For example, in applications where blur is desirable, such as determining pixel depth from a camera's de-focus, it may also be helpful to recover the shape and size of a spatially varying blur kernel.

However, recovering a blur kernel from a single blurred image is an inherently difficult problem due to the loss of information during blurring. The observed blurred image provides only a partial constraint on the solution, as there are many combinations of blur kernels and sharp images that can be convolved to match the observed blurred image.

Techniques related to finding a blur kernel of an image are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A two-dimensional blur kernel is computed for a digital image by first estimating a sharp image from the digital image. The sharp image is derived from the digital image by sharpening at least portions of the digital image. The two-dimensional blur function is computed by minimizing an optimization algorithm that estimates the blur function.

Many of the attendant features will be explained below with reference to the following detailed description considered in connection with the accompanying drawings.

DETAILED DESCRIPTION

Overview

Embodiments discussed below relate to blur estimation. More specifically, a sharp image may be estimated from a blurry input image. The sharp image can be used to recover a blur kernel. With certain types of image blur, image features such as edges, though weakened by blur, can be detected. Even in a blind scenario where the scene content of the blurred image is unknown, if it is assumed that a detected blurred edge would have been a step edge absent any blurring effects, it is possible to detect likely edges in the blurred image and then predict or estimate the locations in the blurred image of the corresponding sharp edges of the scene. Each estimated/computed edge and its corresponding blurred edge provides information about a radial profile of the blur kernel. If an image has edges with a sufficient span of orientations, the blurred image and its predicted sharp image may contain sufficient information to solve for a general two-dimensional blur kernel.

Before further explaining techniques for estimating a blur kernel, consider that a blur kernel is usually a two-dimensional image or array of numbers which when convolved (repeated multiplication and summation-stepped over the pixels of the image) with the desired sharp/true image produces what was seen or imaged. Although blur may be caused by a number of cumulative factors such as motion, defocus, anti-aliasing, etc., these effects can be combined into a single kernel because the convolution of multiple blur kernels result in a single cumulative blur kernel. Convolution and de-convolution will be discussed further with reference to FIG. 3 (note the top of FIG. 3, where the "$\otimes$" symbol represents a convolution operation). The blur kernel, sometimes called a point spread function (PSF) because it models how a pinpoint of light would spread in an actual image, is a kernel that, when convolved with the blurred image's sharp image, produces the blurred image. Once the blur kernel is known, a variety of mathematical techniques can be used to compute the de-blurred image that corresponds to the blurred image from which the blur kernel was computed. Note that the term "blurred image" is used herein for descriptive purposes and merely refers to an image that is to be used to produce a blur kernel. A "blurred image" may or may not appear blurry.

Figure 2:
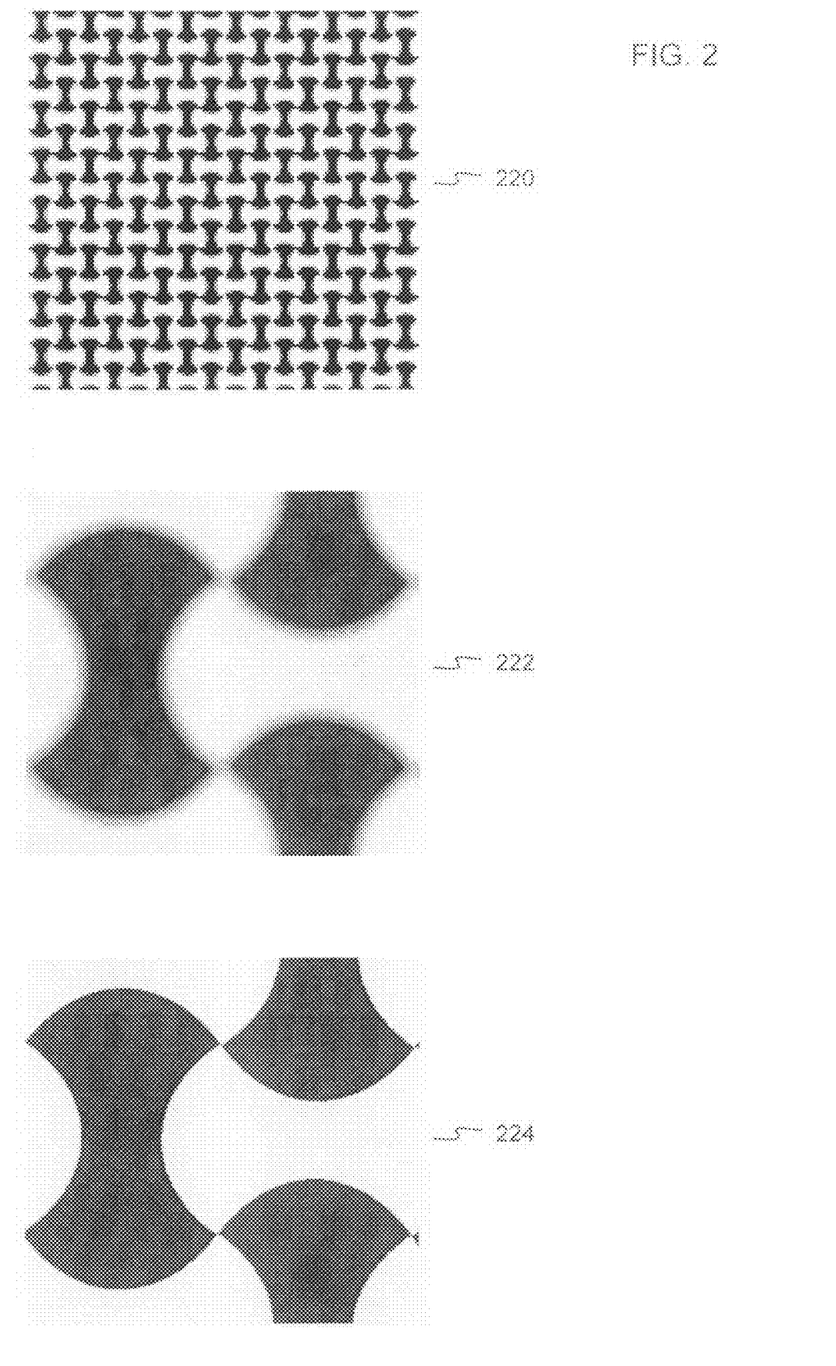
FIG. 2 shows a process for estimating a blur kernel from a blurred image.

FIG. 2 shows a process for estimating a blur kernel 130 from a blurred image 132. The process begins with receiving 134 the blurred image 132. As discussed previously, the image 132 may have blur from a variety of factors such as camera/subject movement or poor focus. Next, a sharp image 134 is estimated 138 from the blurred image 132. While sharp image estimation is a preferred form of enhancing image 132, other forms of image enhancement may be used (what is notable is the estimation of underlying features or form of the blurred image 132). Details of estimating 138 sharp image 136 will be described later with reference to FIGS. 3 and 4. The blur kernel 130 is then computed 140 by applying an optimization algorithm 140.

Image Formation Model

Figure 3:
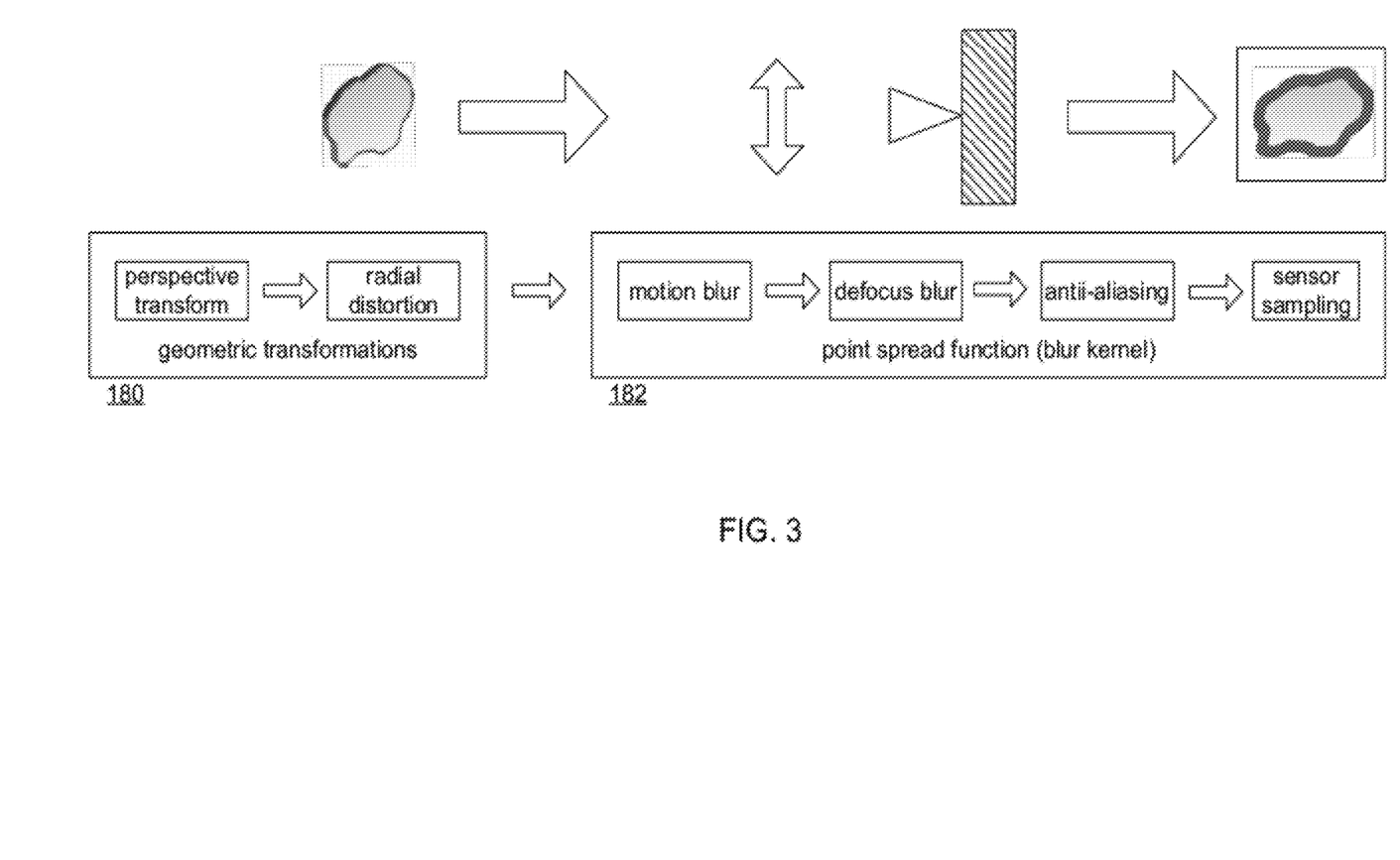
FIG. 3 shows an image formation model underlying various techniques discussed below.

FIG. 3 shows an image formation model underlying various techniques discussed below. The image formation model, and related imaging concepts, will now be explained. The imaging model in FIG. 3 models two geometric transformations 180 as well as blur (blur kernel 182). The geometric transforms 180 include a perspective transform (used when photographing a known planar calibration target) and a radial distortion. The blur kernel 182 can be a result of motion, defocus, sensor anti-aliasing, and finite-area sensor sampling. Blur is modeled as a convolution along the image plane. Depth dependent defocus blur and three-dimensional motion blur are accounted for by allowing the blur kernel 182 to vary spatially. The image formation model is helpful for understanding how to solve for the blur kernel 182.

One embodiment for finding blur kernel 182 involves estimating a discretely sampled version of the model's continuous PSF by either matching the sampling to the image resolution (useful for estimating large blur kernels) or by using a sub-pixel sampling grid to estimate a detailed blur kernel 182 (which can capture sensor aliasing and allow high accuracy image restoration). Also, by computing a sub-pixel blur kernel 182, it is possible to recover a super-resolved de-blurred image by deconvolving an up-sampled image with the recovered blur kernel 182.

Regarding the geometric transformations 180, this world-to-image transformation consists of a perspective transform and a radial distortion. When using mainly the blurred image 132 to recover the blur kernel 182 (referred to herein as the blind method), the perspective transform is ignored; computation is in image coordinates. When a "true" version of the blurred image 132 (e.g., a computed or captured grid pattern or calibration target) is to be used to recover the blur kernel (referred to as the non-blind method), the perspective transformation is modeled as a two-dimensional homography that maps known feature locations $F^k$ on t a grid pattern to detect feature points from the image $F^d$. In this case, a standard model for radial distortion is used: $(F'_x, F'_y)T=(F_x, F_y)^T(a_0+a_1r^2(x, y)+a_2r^4(x, y))$, where $r(x, y)=(F_x^2+F_y^2)^{1/2}$ is the radius relative to the image center. The zeroth, second and fourth order radial distortion coefficients a0, a1, and a2 specify the amount and type of radial distortion.

Given a radial distortion function R(F) and warp function which applies a homography H(F), the full alignment process is $F^d=R(H(F^k))$. The parameters that minimize the $L_2$ norm of the residual $\|F^d-R(H(F^k))\|^2$ are computed. It may not be possible to compute these parameters simultaneously in closed form. However, the problem is bilinear and the parameters can be solved-for using an iterative optimization approach.

Regarding modeling of the blur kernel 182, the equation for an observed image B is a convolution of a kernel K and a potentially higher-resolution sharp image I, plus additive Gaussian white noise, whose result is potentially down-sampled:

$$B=D(I \otimes K)+N, \qquad (1)$$

where $N\sim N(0, \sigma^2)$. D(I) down-samples an image by point-sampling $I_L(m, n)=I(sm, sn)$ at a sampling rate s for integer pixel coordinates (m, n). With this formulation, the kernel K can model most blurring effects, which are potentially spatially varying and wavelength dependent.

Sharp Image Estimation

As seen above, blurring can be formulated as an invertible linear imaging system, which models the blurred image as the convolution of a sharp image with the imaging system's blur kernel. Thus, if the original sharp image is known, the kernel can be recovered. Therefore, when the original sharp image is not available (the blind case) it is helpful to have a reliable and widely applicable method for predicting or estimating a sharp image from a single blurry image. The following two sections (BLIND ESTIMATION, NON-BLIND ESTIMATION) discuss predicting or estimating a sharp image. The next section (BLUR KERNEL ESTIMATION) shows how to formulate and solve the invertible linear imaging system to recover the blur kernel. For simplicity, blurred images are considered to be single channel or grayscale. A later section (CHROMATIC ABERRATION) discusses handling color images.

Blind Estimation

Figure 4:
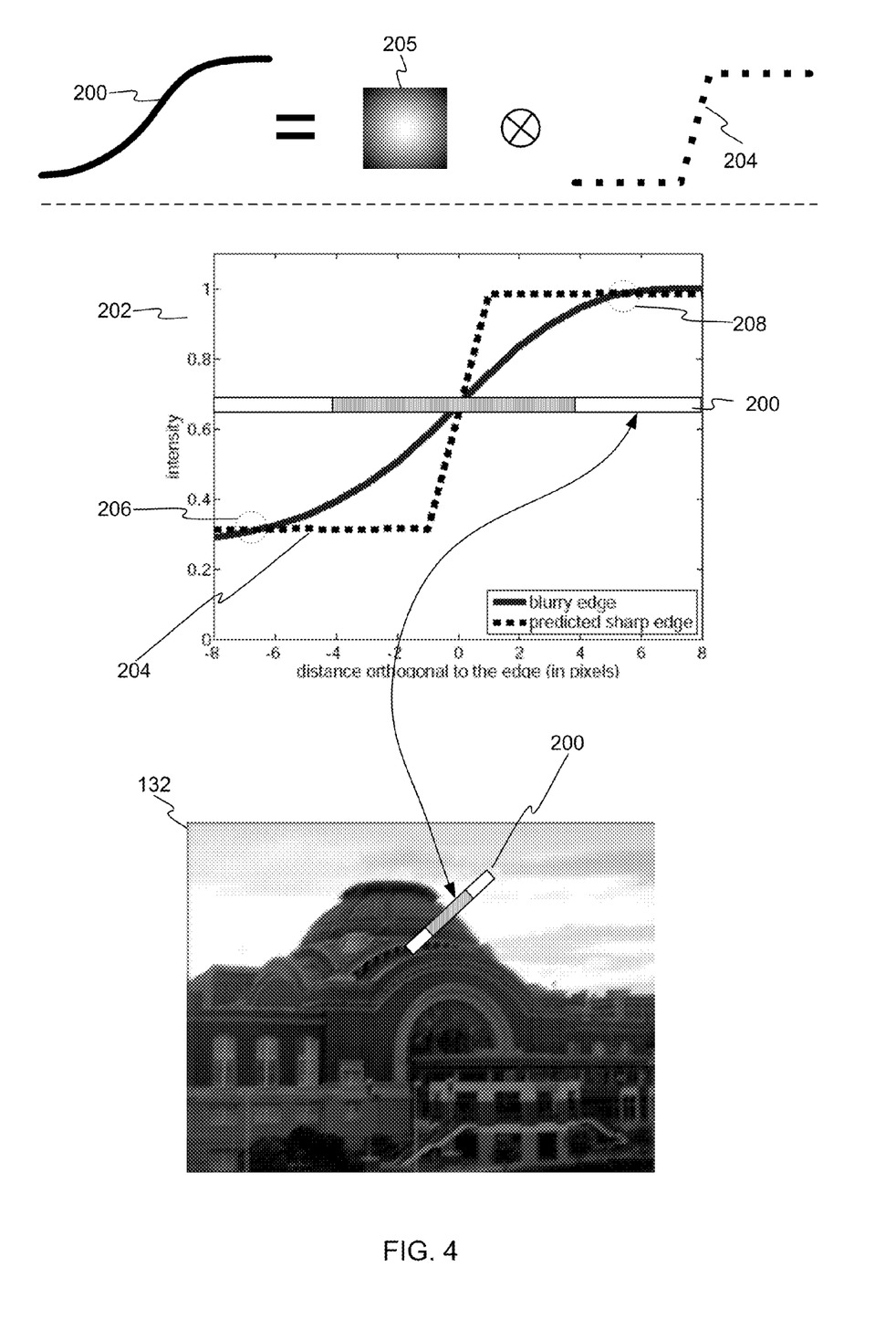
FIG. 4 shows an example of estimating a sharp edge.

FIG. 4 shows an example of estimating a sharp edge. Blurred image 132 has numerous blurry edges, including where the dome meets the sky. A sample profile 200 is shown on blurred image 132. The example sample profile 200 is a sampled line of pixels normal to the edge of the dome in blurred image 132 (the size of profile 200 is exaggerated for illustration). Graph 202 shows the profile 200 of the blurry edge as well as an estimated sharp edge 204 (dotted line). A sharp image can be predicted or estimated from the blurred image 132 by computing many sample profiles normal to and along the blurred edges of blurred image 132, in effect predicting where the true step edges would have been without blurring effects. Referring to the top of FIG. 4, the estimated sharp edge 204 convolved with a blur kernel (to be recovered) 205 should equal the blurred edge 200.

To explain blind estimation further, when only a blurred image may be available for finding a blur kernel, blur is assumed to be due to a PSF with a single mode (or peak), such that when an image is blurred, the ability to localize a previously sharp edge is unchanged. However, the strength and profile of the edge is changed (see sharp edge 204 in graph 202). Thus, by localizing blurred edges and predicting sharp edge profiles, estimating a sharp image is possible.

Edge estimation may be based on the assumption that observed blurred edges result from convolving an ideal step edge with the unknown blur kernel 205. The location and orientation of blurred edges in the blurred image may be found using a sub-pixel difference-of-Gaussians edge detector. An ideal sharp edge may then be predicted by finding the local maximum and minimum pixel values (e.g., pixel values 206, 208), in a robust way, along the edge profile (e.g., profile 200). These values are then propagated from pixels on each side of an edge to the sub-pixel edge location. The pixel at an edge itself is colored according to the weighted average of the maximum and minimum values according to the distance of the sub-pixel location to the pixel center, which is a simple form of anti-aliasing (see graph 202 in FIG. 4).

The maximum and minimum values may be found robustly using a combination of two techniques. The maximum value may be found by marching along the edge normal, sampling the image to find a local maximum using hysteresis. Specifically, the maximum location may be deemed to be the first pixel that is less than 90% of the previous value. Once this value and location are identified, the maximum value is stored as the mean of all values along the edge profile that are within 10% of the initial maximum value. An analogous approach is used to find the minimum pixel value.

Because values can be most reliably predicted near edges, it may be preferable to use only observed pixels within a given radius of the predicted sharp values. These locations are stored as valid pixels in a mask, which is used when solving for the blur kernel. At the end of this sharp image prediction/estimation process the result is a partially estimated sharp image such as sharp image 136 in FIG. 2.

It should be noted that it may not be possible to predict sharp edges throughout the entire blurred image 132. Therefore, the sharp image may be a partial estimation comprised of sharpened patches or regions of the blurred image. It should also be noted that other techniques for predicting the sharp image are known and can be used instead of the difference-of-Gaussians technique discussed above. For example, the Marr-Hildreth algorithm may be used to detect sharp edges.

Non-Blind Estimation

Figure 5:
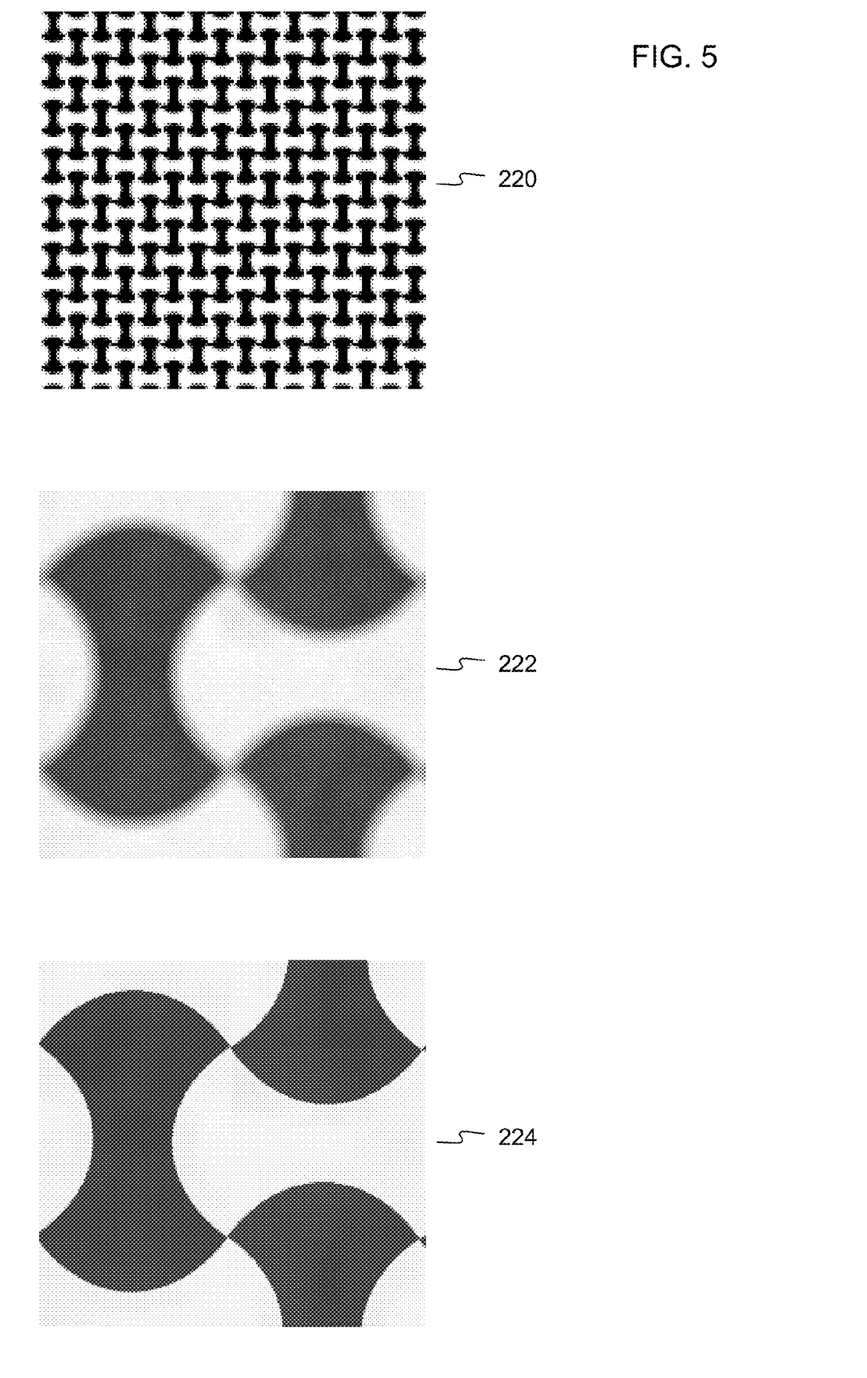
FIG. 5 shows a special calibration pattern that may be used for non-blind blur kernel recovery.

Non-blind sharp edge prediction may be used when the blurred image's true sharp image is known. This approach is typically used in a controlled lab setup. FIG. 5 shows a special calibration pattern 220 that may be used for non-blind blur kernel recovery. An image 222 of pattern 220 is taken and aligned to the image to get the sharp/blurry pair which is used to compute the blur kernel. The grid pattern 220 has corner (checkerboard) features so that it can be automatically detected and aligned, and it also has sharp step edges equally distributed at all orientations within a tiled pattern, thus providing edges that capture every radial slice of the PSF. Generally, calibration patterns that provide measurable frequencies at all orientations will be helpful. Furthermore, the grid pattern 220 can be represented in mathematical form (the curved segments are 90 degree arcs), which gives a precise definition for the grid, which is advantageous for performing alignment and computing sub-pixel resolutions.

For non-blind sharp image prediction, it is again assumed (though not required) that the kernel has no more than a single peak. Thus even when the pattern is blurred, it is possible to detect corners on the grid with a sub-pixel corner detector. Because the corners of pattern 220 are actually balanced checkerboard crossings (radially symmetric), they do not suffer from "shrinkage" (displacement) due to blurring. Once the corners are found, the ground truth pattern 220 is aligned to the acquired image 222 of the pattern 220. To obtain an accurate alignment, both geometric and radiometric aspects of the imaging system may be corrected for. Geometric alignment may be performed using the corrections discussed earlier. A homography and radial distortion correction may be fitted to match the known feature locations on the grid pattern to corners detected with sub-pixel precision on the acquired (blurry) image of the printed grid.

Lighting and shading in the image 222 of the grid pattern 220 may also be accounted for by first aligning the known grid pattern 220 to the image 222. Then, for each edge location (as known from the mathematical form of the ground truth grid pattern), the maximum and minimum values on the edge profile are found and propagated as in the non-blind approach. The grid for pixels is shaded within the blur radius of each edge. By performing the shading operation, it is possible to correct for shading, lighting, and radial intensity falloff. Image 224 in FIG. 5 shows the corresponding cropped part of the known grid pattern 220 warped and shaded to match the image 222 of the grid pattern 220.

Blur Kernel Estimation

Having estimated a sharp image, the PSF can be estimated as the kernel that when convolved with the sharp image produces the blurred input image. The estimation can be formulated using a Bayesian framework solved using a maximum a posteriori (MAP) technique. MAP estimation is used to find the most likely estimate for the blur kernel K given the sharp image I and the observed blurred image B, using the previously-discussed known image formation model and noise level. This can be expressed as a maximization over the probability distribution of the posterior using Bayes' rule. The result is minimization of a sum of negative log likelihoods L(.):

$$P(K/B) = P(B/K)P(K)/P(B) \quad (2)$$

$$\mathrm{argmax}_K P(K/B) = \mathrm{argmin}_K L(B/K) + L(K). \quad (3)$$

The problem is now reduced to defining the negative log likelihood terms. Given the image formation model (Equation 1), the data term is:

$$L(B|K) = \|M(B) - M(I \otimes K)\|^2 / \sigma^2. \quad (4)$$

Note that the downsampling term D in (1) may be incorporated when computing a super-resolved blur kernel, as discussed later.

The function M(.) in Formula (4) is a masking function such that this term is only evaluated for "known" pixels in B, i.e., those pixels that result from the convolution of K with properly estimated pixels I, which form a band around each edge point, as described in the BLIND ESTIMATION section above.

The remaining negative log likelihood term, L(K), models prior assumptions on the blur kernel and regularizes the solution. A smoothness prior and a non-negativity constraint are used. The smoothness prior penalizes large gradients and thus biases kernel values to take on values similar to their neighbors: $L_s(K) = \gamma_\lambda \|\nabla K\|^2$, where $\lambda$ controls the weight of the smoothness penalty, and $\gamma = (2R+1)^2$ normalizes for the kernel area (R is the kernel radius). Since the kernel should sum to one (as blur kernels are energy conserving) the individual values decrease with increased R. This factor keeps the relative magnitude of kernel gradient values on par with the data term values regardless of kernel size. The following error function is therefore minimized (subject to $K_i \geq 0$) to solve for the PSF (blur kernel) using non-negative linear least squares using a projective gradient Newton's method:

$$L = \|M(B) - M(I \otimes K)\|^2 / \sigma^2 + \gamma_\lambda \|\nabla K\|^2 \quad (5)$$

The noise level can be estimated using a technique similar to that of C. Liu et al. ("Noise estimation from a single image", CVPR '06, volume 2, pages 901-908, June 2006). Empirically, $\lambda = 2$ works well.

Super-Resolved Blur Kernel

By taking advantage of sub-pixel edge detection for blind prediction or sub-pixel corner detection for non-blind prediction, it is possible to estimate a super-resolved blur kernel by predicting a sharp image at a higher resolution than the observed blurred image.

For the blind method, in the process of estimating the sharp image, the predicted sharp edge-profile is rasterized back onto a pixel grid. By rasterizing the sub-pixel sharp-edge profile onto an up-sampled grid, a super-resolved sharp image can be estimated. In addition, at the actual identified edge location (as before), the pixel color is a weighted average of the minimum and maximum, where the weighting reflects the sub-pixel edge location on the grid. For the non-blind method, the grid pattern is also rasterized at a desired resolution. Since corners are detected at sub-pixel precision, the geometric alignment is computed with sub-pixel precision. Using the mathematical description of the grid, any upsampled resolution can be chosen when rasterizing the predicted sharp image. Anti-aliasing may also be performed, as described earlier.

To solve for the blur kernel using the super-resolved predicted sharp image $I_H$ and the observed (vectorized) blurry image b, Equation 4 may be modified to include a down-sampling function according to the image model (Equation 1). Also, $b_H = A_H k_H$ is considered to be a super-resolved sharp image blurred by the super-resolved kernel $k_H$, where $A_H$ is the matrix form of $I_H$. Equation 4 is then $\|b - DA_H k_H\|^2$ (the masking function has been left out for readability). D is a matrix reflecting the down-sampling function: $\hat{B}_L(m, n) = \hat{B}_H(sm, sn)$.

Computing a Spatially Varying PSF

Given the formulation above, a spatially varying PSF can be computed in a straightforward manner by performing the MAP estimation process described in the previous section for sub-windows of the image. The process operates on any size sub-window as long as enough edges at different orientations are present in that window. In the limit, a PSF can be computed for every pixel using sliding windows. In practice it was found that such a dense solution is not necessary, as the PSF tends to vary spatially relatively slowly.

For reliable results, this method benefits from having sufficient edges at most orientations. When using the entire blurred image, this is not usually an issue. However, when using smaller windows or patches, the edge content may under-constrain the PSF solution. A simple test may be used to avoid this problem: ensure that (a) the number of valid pixels in the mask described in Equation 4 is greater than the number of unknowns in the kernel, and (b) compute a histogram of 10 degree bins of the detected edges orientations and ensure that each bin contains at least a minimum number of edges (experimentation has shown that a minimum value of 100 is effective, but other values could be used). When this check fails, a kernel for that window is not computed.

Chromatic Abberation

The previous sections did not explicitly address solving blur kernels for color images. To handle color, the blurred image can be simply converted to grayscale. In many cases this is sufficient. However, it is usually more accurate to solve for a blur kernel for each color channel. This need may arise when chromatic aberration effects are apparent.

Due to the wavelength-dependent variation of the index of refraction of glass, the focal length of a lens varies continually with wavelength. This property causes longitudinal chromatic aberration (blur/shifts along the optical axis), which implies that the focal depth, and thus amount of defocus, is wavelength dependent. This also causes lateral chromatic aberration (blur/shifts perpendicular to the optical axis).

By solving for a blur kernel per color channel, the longitudinal aberrations can be modeled using a per-color channel radial distortion correction to handle the lateral distortions. Lateral distortions can be corrected by first performing edge detection on each color channel independently and only keeping edges that are detected within 5 pixels of each other in R, G, and B. A radial correction is then computed to align the R and B edges to the G edges and then perform blind sharp image prediction.

To correct for any residual radial shifts, the green edge locations are used for all color channels so that all color bands have sharp edges predicted at the same locations. This last step could be performed without correcting radial distortion first and by allowing the shifts to be entirely modeled within the PSF; however, the two stage approach has been found to be superior, as it removes some aberration artifacts even when there is not enough edge information to compute a blur kernel. By removing the majority of the shift first, it is possible to solve for smaller kernels.

If RAW camera images are available, more accurate per-channel blur kernels can be computed by accounting for the Bayer pattern sampling during blur kernel computation instead of using the demosaiced color values. A blur kernel is solved at the original image resolution, which is 2× the resolution for each color channel. The point sampling function discussed above may be used, where the sampling is shifted according to the appropriate Bayer sample location.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on. The embodiments can also be performed in digital cameras or video cameras, given sufficient CPU capacity.

The invention claimed is:

1. One or more volatile and/or non-volatile computer-readable media storing information to enable a device to perform a process, the process comprising:
   receiving a digital image;
   finding continuous two-dimensional blurred edges in portions of the digital image and computing corresponding two-dimensional sharpened edges oriented and located relative to the digital image;
   computing a blur kernel based on the two-dimensional sharpened edges; and
   applying the blur kernel to the digital image to produce a de-blurred version of the digital image.

2. One or more computer readable media according to claim 1, wherein the finding the continuous two-dimensional blurred edges is performed using a sub-pixel difference of Gaussians edge detector.

3. One or more computer readable media according to claim 2, wherein the computing the two-dimensional sharpened edges further comprises finding a local maximum and minimum pixel values along a profile of an edge and propagating these values from pixels on each side of an edge to a sub-pixel edge location.

4. One or more computer readable media according to claim 1, wherein the sharpened edges are stored in a mask comprised of pixels of the digital image that are local to the computed sharpened edges.

5. One or more computer readable media according to claim 1, wherein the digital image is an image of a known calibration pattern and the calibration pattern is used to help find the blur kernel.

6. One or more computer readable media according to claim 5, wherein the using the calibration pattern comprises aligning the calibration pattern to the digital image and matching known feature locations of the calibration pattern to corners detected in the digital image.

7. One or more computer readable media according to claim 1, wherein the blur kernel is computed with sub-pixel resolution such that it has greater resolution than the digital image.

8. One or more volatile and/or non-volatile computer-readable media according to claim 1, further the applying the blur kernel comprising deconvolving the digital image with the two-dimensional blur kernel to produce the de-blurred version of the digital image.

9. One or more volatile and/or non-volatile computer-readable media according to claim 1, wherein the sharpened edges comprise continuous two-dimensional edges estimated from and oriented to the digital image.

10. One or more volatile and/or non-volatile computer-readable media according to claim 1, wherein the blur kernel is computed blindly without using a reference image corresponding to the digital image.

11. One or more volatile and/or non-volatile computer-readable media according to claim 1, wherein the blur kernel is computed with greater pixel resolution than the digital image.

12. One or more volatile and/or non-volatile computer-readable media according to claim 11, wherein the digital image comprises an image of a calibration pattern, and the process further comprises aligning the calibration pattern and the digital image and using the aligned calibration pattern to compute the sharpened edges of the digital image.

13. One or more volatile and/or non-volatile computer-readable media according to claim 1, wherein the only image data used to compute the blur kernel comprises the digital image and an image comprised of the sharpened edges derived from the digital image.

14. A device comprising:
 a processor and memory, the device configured to perform a process, the process comprising:
  acquiring a blurred digital image stored in the memory;
  detecting blurred edges in the blurred digital image and estimating corresponding underlying sharp edge lines, stored in the memory, that created the blurred edges when the blurred digital image was captured; and
  computing a blur kernel based on the sharp edge lines and the blurred digital image.

15. A device according to claim 14, wherein the blur kernel has sub-pixel resolution relative to the blurred digital image.

16. A device according to claim 14, wherein the process further comprises using the blur kernel to de-blur the blurred digital image.

17. A method according to claim 16, wherein the blurred digital image is an image of a test pattern and the test pattern is used in computing the blur kernel.

18. A device according to claim 14, wherein the test pattern is configured to have edges at substantially all orientations of the test pattern.

19. A device according to claim 18, wherein the test pattern is configured to provide measurable frequencies at substantially all orientations.

* * * * *